Jan. 3, 1967   J. MULLER   3,295,415
MACHINE TOOL WITH TWO ALTERNATELY USABLE SPINDLES
Filed Oct. 18, 1965   3 Sheets-Sheet 1

INVENTOR
JOHANN MULLER
BY *Rupert J. Brady*
ATTORNEY

Jan. 3, 1967   J. MULLER   3,295,415
MACHINE TOOL WITH TWO ALTERNATELY USABLE SPINDLES
Filed Oct. 18, 1965   3 Sheets-Sheet 2

INVENTOR
JOHANN MULLER
BY Rupert J. Brady
ATTORNEY

Jan. 3, 1967  J. MULLER  3,295,415
MACHINE TOOL WITH TWO ALTERNATELY USABLE SPINDLES
Filed Oct. 18, 1965  3 Sheets-Sheet 3
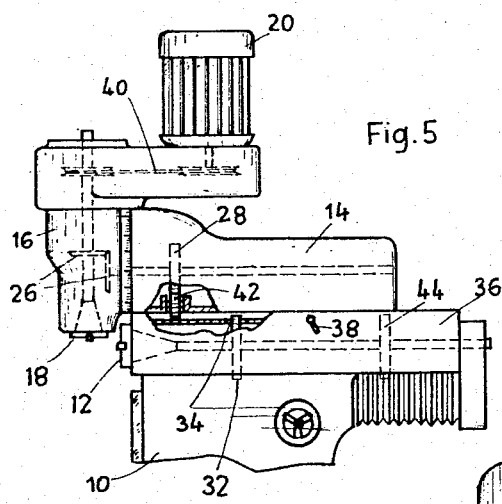
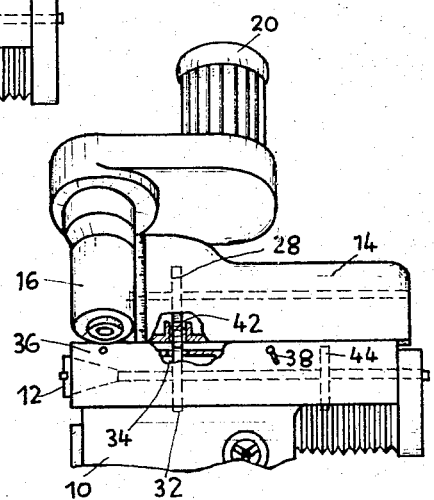
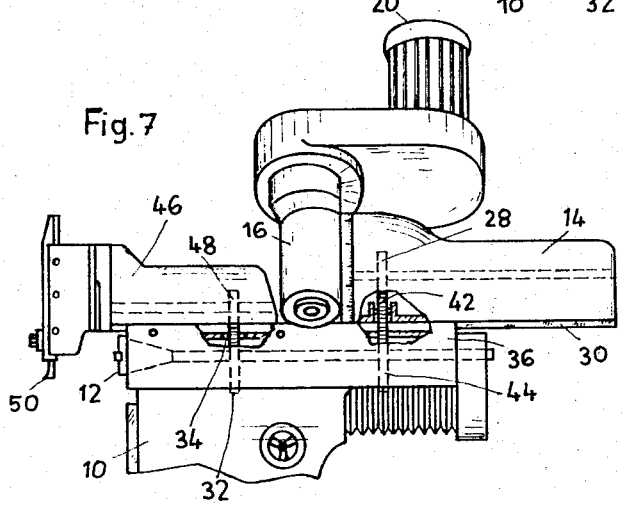
INVENTOR
JOHANN MULLER
BY Rupert J. Brady
ATTORNEY

United States Patent Office 3,295,415
Patented Jan. 3, 1967

3,295,415
MACHINE TOOL WITH TWO ALTERNATELY USABLE SPINDLES
Johann Muller, Munich, Germany, assignor to Hans Deckel, Munich, Germany, and Friedrich W. Deckel, Zug, Switzerland
Filed Oct. 18, 1965, Ser. No. 497,358
Claims priority, application Germany, Oct. 28, 1964, D 45,734
7 Claims. (Cl. 90—11)

This invention relates broadly to machine tools and more particularly to a machine tool, such as a milling machine, having two alternately usable tool spindles driven by the same motor and main transmission gearing.

Machine tools of this general description, which provide two alternately usable spindles where one of the spindles is mounted in a spindle block or housing which is displaceable on the support or housing of the other spindle, are known in the art and such a machine is disclosed in Patent 3,117,493 for Machine Tool, issued to K. Zwick et al., on Jan. 14, 1964, and owned by the assignee of the present application. In such a machine tool, such as a milling machine with two horizontal spindles (drilling and milling spindles) or with one horizontal and one vertical spindle, the spindle housing is designed so that it can be pushed from a working position, of the spindle carried thereby, into a rest or non-use position and it remains in the latter position during the period of working with the second spindle without interfering with the operation of the second spindle.

Several designs for the drive of the two alternately usable spindles are known in the prior art with the previously mentioned patent showing the use of only one driving motor and one main drive transmission for both spindles jointly. With this arrangement the motor and transmission are housed in the machine main frame or stand and are disposed to first drive the main spindle. From the motor the drive is transmitted through gears mounted in the machine frame to gears mounted in the spindle housing which are connected with the spindle mounted therein. In order that the spindle housing may be displaced relative to the drive connection in the machine frame, at least one of the gears must be designed as a relatively long toothed cylinder and either the machine frame or the spindle housing must have a correspondingly long aperture therein for the cylinder, and this is bad for the stability of the machine parts since the aperture tends to weaken the framework.

Patent 2,963,944, issued Dec. 13, 1960, to S. C. Straus for Convertible Milling Machine, discloses another manner of driving the two alternately usable spindles. In the construction disclosed therein each spindle is provided with its own individual driving motor and transmission. This arrangement provides a stable machine but the spindles are entirely independent of each other which results in a costly construction and duplication of parts.

It is therefore an object of the present invention to provide a construction of machine tool with two alternately usable spindles which incorporates the advantageous qualities of the machines in the mentioned patents and eliminates their unfavorable aspects.

Another object of the invention is to provide a construction of machine tool of the type described, in which a common driving motor for both spindles is carried above the machine stand by a movable spindle housing.

A further object of the invention is to provide a stable machine tool with two alternately usable spindles having a novel construction of gearing in the driving transmission from the motor in a movable machine part which is adapted to move into driving engagement with gearing in another machine part in one position thereof to drive a second working spindle without the need of a separate driving motor and transmission speed changer.

Still another object of the invention is to provide a construction of machine tool of the type described in which the first spindle can be easily disengaged from the driving transmission while working with the second spindle.

Other and further objects of the invention reside in the provision of two separate rest or non-use positions of the spindle housing supporting the motor drive for driving the second spindle through corresponding separate and spaced transmission parts to enable a third tool means to be driven by the common motor through one of the second spindle separate transmissin parts in one of the rest positions.

Other objects will also become apparent to those skilled in the art from the specification hereinafter following by reference to the accompanying drawings, in which:

FIG. 5 is a side elevational view on a reduced scale, similar to FIG. 3, showing another modified form of the invention with the first spindle housing in operating position;

FIG. 6 is a view similar to FIG. 5, but showing the first spindle housing in its first rest position and the second spindle operational; and FIG. 7 is a view similar to FIGS. 5 and 6 but showing the first spindle housing in its second rest position and a third tool means connected with the first rest position drive transmission of the second spindle.

Figure 1:
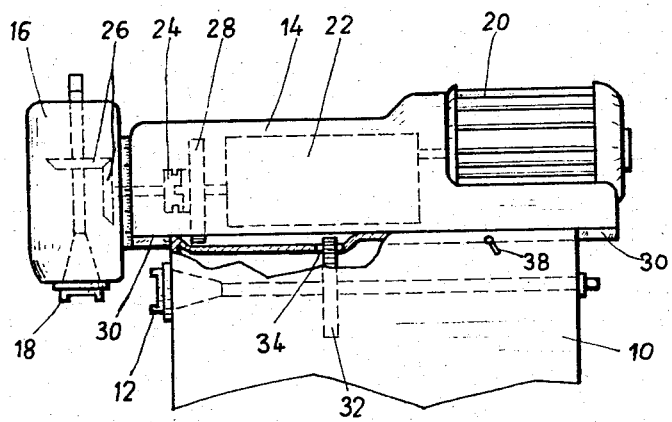
FIG. 1 is a side elevational view, partly in broken-away section, of the top portion of a milling machine stand showing one spindle on a displaceable spindle housing in operating position.
Figure 2:
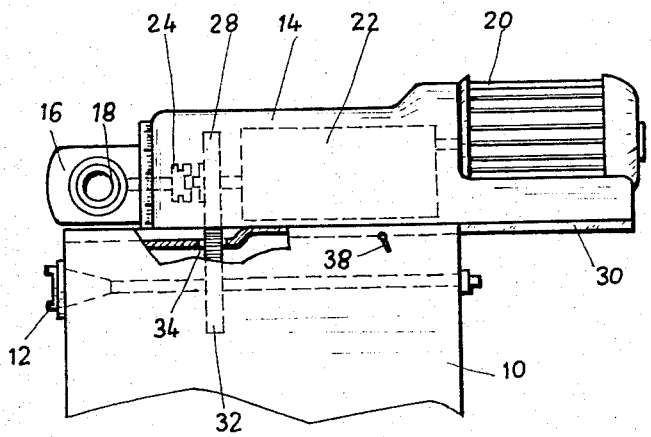
FIG. 2 is a main view similar to FIG. 1 showing the spindle and displaceable spindle housing in a rest or non-use position.

Referring to FIGS. 1 and 2 of the drawings, in greater detail, a horizontal spindle 12 is shown mounted for rotation in the top portion of the upstanding frame or support member 10 of a milling machine. A spindle block or housing 14 is mounted on the upper surface of machine frame or stand 10 for horizontal displacement, and carries a spindle head 16 on its front end in which a vertical spindle 18 is rotatably mounted. The spindle head 16 is pivotally mounted about a horizontal axis to swivel in a vertical plane, so that the spindle 18 can be selectively moved to any desired operating angle in the vertical plane.

A driving motor 20 is connected to spindle housing 14 and is carried thereby when displaced in the horizontal plane. Driving motor 20 is connected to drive first spindle 18 carried by the same spindle housing through gearing, including a transmission shown generally at 22, a disengageable coupling 24, and a pair of beveled gears 26. A gear or transmission member 28 is connected in the main gear train between the transmission 22 and disengageable coupling 24 such that its rim or periphery protrudes downwardly beneath spindle housing 14 over the swallowtail or dovetail guides 30 through which the spindle housing is connected to the machine frame for longitudinal horizontal displacement. A gear or transmission part 32 is mounted on the shaft of horizontal spindle 12 and is arranged so that its periphery extends through aperture 34 on the upper surface of machine stand 10 into the horizontal displaceable movement path of gear 28 of spindle housing 14. It is to be noted that aperture 34 in the machine stand is relatively small and does not therefore impair the stability of the machine stand or the dovetail guides 30. In the same manner, only a small aperture (not shown) similar to aperture 34 is provided through the lower face of spindle housing 14 for gear 28 to enable it to protrude therefrom. When vertical spindle 18 is pivoted to the horizontal position, as shown in FIG. 2, and spindle housing 14 is pushed to its rearmost position on guides 30, as indicated in FIG. 2, gear 28 moves into driving engagement with gear 32 which is disposed in its path of travel. This rearmost position is the rest or non-use position of first spindle 18. In this position, driving motor 20 drives horizontal spindle 12 through the transmission 22, transmission members including gear 28 and transmission part or gear 32. In the rearmost position of the spindle housing, the front portion of spindle head 16 terminates approximately with the front face of machine frame 10, so that the horizontal or second spindle 12 can be used unhindered by the first spindle. Rotation or operation of first spindle 18 is arrested by releasing the coupling 24, as indicated in FIG. 2, to open the transmission drive to the first spindle. The disengageable coupling is thus arranged between the first spindle 18 and the transmission members 28 leading to the second spindle transmission parts 32 so the first spindle can be disconnected when working with the second spindle.

Transmission 22 may constitute a speed changer connected within spindle housing 14 and it is to be noted that the transmission members 28, leading to the second spindle transmission parts 32, branch off the gear train behind or on the output side of the speed changer. This arrangement eliminates the need for both a separate driving motor and a separate speed changer or shift gearing for the second spindle 12 since the arrangement enables the same motor and speed changer which normally drives the first spindle to drive the second spindle when the spindle housing 14 is moved to its rest or non-use position.

Thus when first spindle 18 is in working position, as shown in FIG. 1, spindle housing 14 is horizontally displaceable unhindered over its normal path of movement and there is no driving connection between its transmission members and second spindle 12. The driving connection with second spindle 12 is only established when first spindle 18 is taken out of operation and moved to its rest position, at which point, second spindle 12 becomes operational through the drive connection indicated at 28 and 22. The relatively long-toothed cylinder, previously mentioned, when discussing the structure shown in Patent 3,117,493, and the disadvantages connected therewith, is eliminated because with the structure of the present invention is unnecessary to maintain the driving connection at 28 and 32 over a long displacement path of spindle housing 14.

Figure 3:
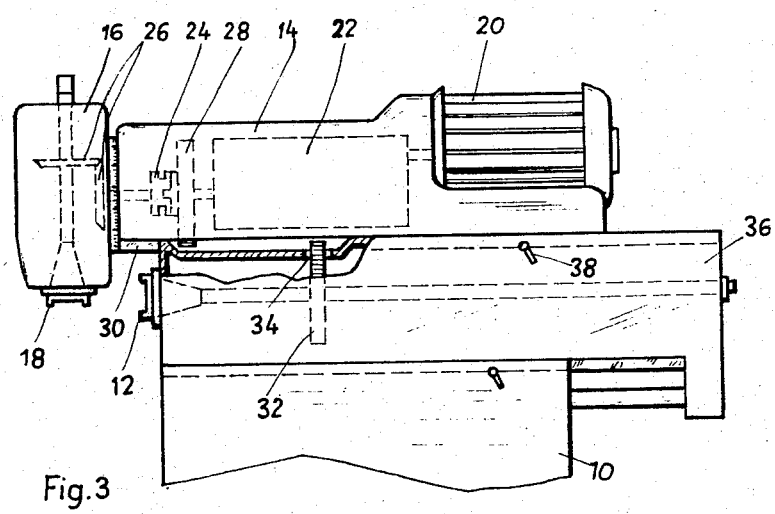
FIG. 3 is a view similar to FIG. 1 of a modified form of the invention showing the second spindle on a displaceable second spindle housing.
Figure 4:
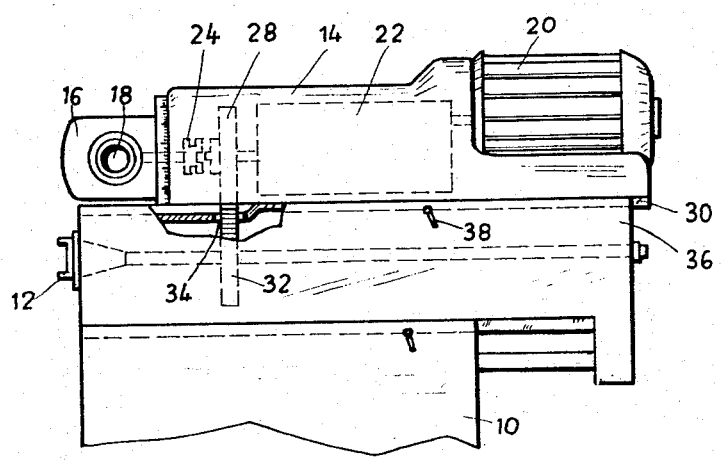
FIG. 4 is a view similar to FIG. 2 but of the modified form of FIG. 3.

The modified form of the invention shown in FIGS. 3 and 4 differs from the form of the invention shown in FIGS. 1 and 2 only in that the horizontal spindle 12, instead of being mounted directly in the machine frame or stand 10, is mounted in a second spindle block or housing 36 which is horizontally displaceable on the top surface of machine frame 10 through a dovetail guide connection to provide an axially displaceable second spindle 12. This is the preferred form of the invention.

Spindle housing 14 is thus connected for horizontal displacement by dovetail guides 30 to the top surface of second spindle housing 36, while all other components are the same as shown in FIGS. 1 and 2, and are thus designated by corresponding reference numerals. The operation of the spindles and drive mechanism in this form of the invention is the same as previously described.

While working with the first spindle 18 the spindle housing 14 can be secured in its particular working position by means of the guide clamps 38 which are well known in the art. If spindle housing 14 carries a horizontal drilling spindle in lieu of the vertical spindle 18, as shown, it would be advantageous to construct spindle housing 14 with longer guides for forward displacement. Such construction is known in the art and has therefore not been shown in the drawings. The form of the invention shown in FIGS. 3 and 4, where second spindle housing 36 is displaceable forwardly in the horizontal plane, is best suited for machines in which the worktable is not displaceable in transverse direction. It will be noted that when second spindle 12 is in operation and is horizontally displaced relative to machine stand 10, there is no relative movement between spindle housings 14 and 36 as they move as a unit to maintain the drive connection between the motor and second spindle.

A further modified form of the invention is shown in FIGS. 5–7 which discloses a universal milling machine very similar to the machine disclosed in FIGS. 3 and 4. Functionally similar components, corresponding to those shown in the previous forms of the invention, are designated by similar reference numerals. In this form of the invention driving motor 20 is arranged directly on the spindle head 16, rather than on the spindle housing 14, but the motor is still supported by housing 14. The speed changer located between motor 20 and first spindle 18 is illustrated in simplified form at 40 as an infinitely variable belt drive, but it is to be understood that other types of speed changers can be utilized between motor 20 and the spindle head. Spindle 18 is driven directly from the speed changer and the shaft carrying gear 28 which is in continuous engagement with an intermediate pinion 42 is driven by spindle 18 through bevel gears 26. Pinion 42 protrudes downwardly and outwardly through an aperture in spindle housing 14 and in the first rest or non-use position of spindle housing 14, as shown in FIG. 6, it is connected into driving engagement with transmission part or gear 32 which is mounted on second spindle 12 a small distance from the spindle nose and the tool connected therein. In this first rest position, first spindle 18 is out of operation and work is performed with the second spindle 12 which is driven by motor 20 through the bevel gears 26 and gears 28, 42 and 32. The torsion of horizontal spindle 12 is small because of the small distance gear 32 is placed from the nose of spindle 12 which carries the tool.

In FIG. 7, spindle housing 14 is shown pushed rearwardly into its second rest or non-use position in which pinion 42 is connected in driving engagement with transmission part of gear 44 connected on second spindle 12 in rearward spaced relation from gear 32. In this second rest position, the spindle housing 14 releases and uncovers transmission part or gear 32 so that it can be used for driving an additional attachable tool head 46 which is inserted in the dovetail guide on the top surface of second spindle housing 36. Tool head 46 is thus rigidly connected to housing 36 and is provided with a gear 48 in driven engagement with gear 32 which is rotated in unison with gear 44. The tool head 46 may carry an impact tool 50 and it may be replaced by similarly designed attachable tool heads carrying other accessory tools. In this way it is possible to selectively drive three different tools with the common motor 20.

Thus in the last mentioned form of the invention, in both the first and second rest or non-use positions of spindle housing 14, the branching transmission members including gears 28 and 42 enter into driving connection with the transmission parts 32 and 44 of the second spindle 12, positioned along the second spindle in spaced relation corresponding to the two rest positions. In the rearmost rest position when the rearmost gear 44 is used to drive the second spindle, the foremost gear 32 is freed to drive additional tool members and is driven through the transmission chain 32, 12, 44, 42, 28, 26, 18, 40 and motor 20.

While the invention has been shown and described in certain preferred embodiments it is realized that modifications can be made without departing from the spirit of the invention, and it is to be understood that no limitations upon the invention are intended other than those imposed by the scope of the appended claims.

What I claim as new and desire to secure by Letters Patent of the United States, is as follows:

1. In a machine tool with two alternately usable spindles, a support member, a spindle housing displaceably mounted on said support member, a first spindle means mounted for rotation on said spindle housing, a driving motor supported by said spindle housing and connected to rotate said first spindle means, transmission members connected in said spindle housing and connected to said driving motor to be driven thereby, a second spindle means mounted for rotation on said support member, transmission parts connected to said second spindle means, said spindle housing being displaceable on said support member from a working position of said first spindle means to a rest position of said first spindle means in which it remains during use of said second spindle means, and said transmission members connected to move into driving connection with said transmission parts to rotate said second spindle means with said driving motor when said support member is displaced to the rest position.

2. In a machine tool as set forth in claim 1 including speed changer means supported by said spindle housing and connected with said driving motor to drive said first spindle means and said transmission members, and said transmission members which move into driving connection with the second spindle means transmission parts connected to the output side of said speed changer means.

3. In a machine tool as set forth in claim 1 including a releasable drive coupling connected between said transmission members which move into driving connection with the second spindle means transmission parts and said first spindle means.

4. In a machine tool as set forth in claim 1 including a machine stand, and said support member comprising a second spindle housing connected for parallel displacement to said machine tool.

5. A machine tool as set forth in claim 1 in which said spindle housing supporting said driving motor is displaceable on said support member to first and second rest positions of said first spindle means, said transmission parts comprising first and second transmission parts connected in spaced relation with each other to said second spindle means corresponding to the first and second rest positions of said spindle housing and connected in the displacement path of said transmission members, said transmission members connected in driving relation with said first transmission part to rotate said second spindle means when said spindle housing is displaced to its first rest position, and said transmission members connected in driving relation with said second transmission part to rotate said second spindle means and said first transmission part when said spindle housing is displaced to its second rest position, said spindle housing positioned remotely from said first transmission part in the second rest position, and a tool head adapted for connection with said support member and said first transmission part in the second rest position of said spindle housing.

6. A machine tool as set forth in claim 1 in which said spindle housing is connected above said support member, said transmission parts including a gear member depending from said spindle housing, and said transmission parts including at least a gear wheel extending from said support member in the displacement path of said gear member when said spindle housing is moved to the rest position.

7. A machine tool as set forth in claim 4 in which said driving motor is connected to said spindle housing, a first longitudinal guide connection between said spindle housing and said second spindle housing, a second longitudinal guide connection between said second spindle housing and said machine stand, and said spindle housing and said second spindle housing displaceable longitudinally in said first and second longitudinal guide connections, parallel to each other and to said machine stand.

No references cited.

WILLIAM W. DYER, JR., *Primary Examiner.*

G. A. DOST, *Assistant Examiner.*